Patented Jan. 9, 1940

2,186,694

UNITED STATES PATENT OFFICE 2,186,694

PROCESS FOR THE MANUFACTURE OF COMPLEX GOLD COMPOUNDS OF ALBUMOSE - LIKE KERATIN DEGRADATION PRODUCTS CONTAINING SULPHHYDRYL GROUPS

Adolf Feldt, Berlin-Charlottenburg, and Karl Schöllkopf, Berlin-Dahlem, Germany, assignors to Schering Aktiengesellschaft, a corporation of Germany No Drawing. Application June 10, 1937, Serial No. 147,492. In Germany June 12, 1936

9 Claims. (Cl. 260—113)

This invention relates to the manufacture of complex water-soluble gold compounds of albumose-like keratin degradation products containing sulphhydryl groups.

The manufacture of gold compounds of keratin degradation products has already been carried out by various processes. Thus, for example, they are obtained according to the processes of German patent specification Nos. 551,871 and 550,705 by subjecting keratin substances with simultaneous or subsequent reduction to acid hydrolysis until the keratin substance has just passed into solution, whereupon after concentration, for example, by evaporation of the acid hydrolysate in vacuum, gold salts are allowed to react in the customary manner upon the solution of keratin degradation products obtained.

According to the process of German patent specification No. 578,828 gold compounds of keratin degradation products containing sulphhydryl groups are obtained by reducing the acid hydrolysate of the keratin substances with zinc, then separating the water-insoluble zinc keratin compound produced, converting this into a product termed a sulphhydryl keratinic acid and finally introducing gold into the latter in the customary manner. However, experiments have shown that according to this process only small portions of the keratin degradation products can be caused to react to give the corresponding gold compound by way of the water-insoluble zinc compound, since the majority of the keratin degradation products is lost in the form of water-soluble zinc compounds.

According to the present invention it is possible from the total hydrolysate of keratin substances obtained by acid treatment and reduction to produce complex water soluble gold compound of high therapeutic activity with a gold content of over 10% without having to carry out the cumbersome isolation of the above mentioned zinc compounds and the very labile sulphhydryl keratinic acid which considerably reduces the yield. This process for the direct separation of the highly active gold compounds of albumose-like keratin degradation products containing sulphhydryl groups with a gold content of over 10% can be carried out as follows:

The acid hydrolysis of the keratin substances, such as wool, hair and horn is carried out only to such an extent that these starting materials have just passed into solution and form filterable colloidal aqueous solutions of the albumose-like keratin degradation products. In order to convert the keratin degradation products with disulphide-like bond obtained by acid hydrolysis into the corresponding compounds containing sulphhydryl groups it is possible to proceed in such a manner that the reduction is carried out either simultaneously with the acid hydrolysis by means of metals such as zinc, tin or iron or by subsequently reducing the acid hydrolysate, for example, with zinc dust, preferably in the cold, in order to avoid further degradation. As particularly advantageous has proved the reduction of the disulphide-like keratin degradation products with sulphurous acid or the neutral or acid alkali metal or alkaline earth metal salts of this acid, such as sodium sulphite, sodium bisulphite, magnesium bisulphite, calcium sulphite and the like.

Compared with the above mentioned reduction of keratin degradation products with hydrogen produced from metals and acids, the application of sulphurous acid or its salts offers a series of technical advantages. Thus the cumbersome separation of the metals employed for the reduction with the aid of hydrogen sulphide and also the removal of the latter from the reduced hydrolysate are entirely obviated.

The excess of acid employed for the hydroylsis of the keratins is then neutralized with basic substances such as ammonia or the oxides, hydroxides or carbonates of the alkali or alkaline earth metals or of magnesium, either completely or to the point of acid reaction to litmus without acid reaction to Congo red. In the case of the reduction by means of metals the metals which thereby pass into solution are completely removed by means of hydrogen sulphide and then the latter driven off by means of an indifferent gas such as nitrogen, carbon dioxide or hydrogen for the purpose of avoiding the oxidation of the sulphhydryl group.

On the weakly acid or neutral hydrolysate thus obtained, without previous concentration, for example, by evaporation in vacuum, for the purpose of the introduction of the gold in complex combined form into the keratin degradation product suitable gold compounds such as aurous compounds, for example, aurous hydroxide, aurous iodide or auric compounds, for example, auric chloride, gold chloride (hydrochloride), potassium auribromide and the like are caused to react. With the application of auric compounds it may also be of advantage to work in the presence of sulphurous acid or its salts. In an astonishing manner it has been found that by this means not only so much gold can be introduced as is just necessary for combination with the sulphhydryl groups present, which can easily be ascertained by means of the known spot method with sodium nitroprusside, but that in addition considerably more gold is combined in a complex manner by the keratin degradation product.

After the interaction of the weak acid or neutral hydrolysate with the gold compounds, if desired the weak acid solutions obtained are rendered just weakly alkaline with suitable inorganic basic substances which are capable of forming therapeutically valuable salts, such as the oxides, hydroxides and carbonates of the alkali metals, of calcium and of magnesium. The weak alkaline solution now present, which contains the alkali or magnesium or calcium salts of the complex gold sulphhydryl keratinic acids, is for the purpose of a separation of the latter in solid form suitably stirred into several times of the volume of an inorganic water miscible solvent such as ethyl or methyl alcohol or acetone and the like, whereby the corresponding salt of the complex gold sulphhydryl keratin acid separates. After a few hours the organic solvent is separated and the precipitated gold compound further purified if desired by dissolving several times in water and again precipitating with the organic solvent and finally dried.

The complex gold compounds of the albumose-like keratin degradation products containing sulphhydryl groups obtained constitute weak yellow to white solid substances which are easily soluble in water, contain the gold completely combined in complex form, are rich in sulphur and exhibit a gold content of up to about 40%.

It was quite astonishing that compared with the known processes, which as in the case of German Patent No. 551,871 treat the keratin degradation product in the form of an evaporated syrup or as in the case of German Patent No. 578,828 as isolated free sulphhydryl keratinic acid with the gold salts, in the present process by the reaction of the weakly acid or neutral complete hydroylsate with the gold compounds highly active chemotherapeutic products are obtained.

The following examples serve to illustrate the invention without, however, limiting the same to them:

*Example 1*

600 grams of human hair are hydrolysed with 2400 ccs. of a 20% hydrochloric acid in a water bath at 95° C. during one hour. Then to the hydrolysate 60 grams of tin foil are added and the reaction mixture is heated for a further half hour with frequent shaking to 95° C. Thereupon it is cooled to 20° C. and the excess of hydrochloric acid neutralized with cooling with so much ammonia ($d=0.910$) that the reaction mixture no longer reacts acid to Congo red but still acid to litmus. The hydrolysate is then filtered from insoluble portions and from the filtrate by means of hydrogen sulphide the tin separated as tin sulphide. After the removal of the hydrogen sulphide by means of hydrogen the hydrolysate is immediately suitable for the introduction of the gold.

For this purpose to the hydrolysate so much of a 20% aqueous solution of gold chloride (hydrochloride) (with a gold content of about 50%) is gradually added with stirring that the sodium nitroprusside reaction just fails to take place. For example, for this purpose 36.5 grams of the gold chloride (hydrochloride) are necessary. The hydrolysate treated in this manner with the gold compound is thereupon rendered weakly alkaline with caustic soda lye (pH 7.1–7.2) and the liquid filtered. The filtrate is introduced into 6 times the volume of alcohol whereby the sodium salt of the gold sulphhydryl keratinic acid first separates in oily form. After some standing the alcohol is separated from the sodium salt, the latter dissolved in 900 ccs. of water and this solution after repeated filtration stirred into 8 times the volume of alcohol. The sodium salt of the gold sulphhydryl keratinic acid which now precipitates in flocculent solid form is separated from the alcohol, repeatedly treated with alcohol and then with ether and finally dried in vacuum at about 60° C. 76 grams of sodium gold sulphhydryl keratinate are obtained as a light yellowish-grey, easily water-soluble powder with a gold content of 20.8%.

*Example 2*

The process is carried out as in Example 1 but the reaction of the hydrolysate is carried out with double the quantity of gold chloride (hydrochloride) of that mentioned. The further working up then takes place in an analogous manner to that described in Example 1. A yellowish sodium gold keratinate is obtained with a gold content of 40.8% in which the gold is still all combined in a complex manner.

*Example 3*

The process is carried out as in Example 1 but the acid hydrolysate treated with the gold compound, instead of with caustic soda lye, is brought with magnesium carbonate to a pH of 7.1. The further working up takes place in an analogous manner to that described in Example 1. 92 grams of magnesium gold sulphhydryl keratinate are obtained as a weak yellowish-grey easily water-soluble powder with a gold content of 17.8%.

Instead of the neutralization as described in Example 1 of the excess hydrochloric acid employed for the hydrolysis with ammonia, this can also take place in the present case with magnesium oxide or hydroxide.

*Example 4*

The acid hydrolysate treated with the gold compound obtained according to Example 1 is brought with calcium hydroxide to a pH of 7.1 and further worked up in an analogous manner to that described in Example 1. 134 grams are obtained of calcium gold sulphhydryl keratinate as a white easily water soluble powder with a gold content of 12.4%.

*Example 5*

600 grams of human hair are hydrolyzed with 2400 ccs. of a 20% hydrochloric acid by heating in a boiling water bath for 70 minutes. Then the hydrolysate is cooled to 20° C. and neutralized with ammonia ($d=0.910$). After the filtration of the insoluble portions to the filtrate 500 ccs of 5.5% aqueous sulphurous acid are added and, after 2 days reaction, to the reduced hydrolysate with stirring so much of a 20% aqueous solution of gold chloride hydrochloride is gradually added drop by drop that the sodium nitroprusside reaction is still only weakly positive. The acid hydrolysate thus caused to react with the gold compound is thereupon rendered weakly alkaline with caustic soda lye (pH 7.1–7.2) and the liquid filtered. The filtrate is stirred into 6 times the volume of alcohol, whereby the sodium salt of the gold sulphhydryl keratinic acid first separates in oily form. After some standing the alcohol is separated from the sodium salt, the latter dissolved in 1500 ccs. of water to which sufficient caustic soda lye for a weak alkaline reaction is added and the solution after repeated filtration stirred into 8 times the volume of alcohol. The sodium salt of the gold sulphhydryl keratinic acid which now precipitates in flocculent solid form is separated from the alcohol, repeatedly treated with alcohol and then with ether and finally dried in vacuum at about 60° C. 126 grams are obtained of sodium gold sulphhydryl keratinate as a light yellowish-grey easily water soluble powder with a gold content of 20.8%.

*Example 6*

The process is carried out as in Example 5 but the acid hydrolysate treated with the gold compound, instead of with caustic soda lye, is brought with magnesium carbonate to a pH of 7.1. The further working up takes place in an analogous manner to that described in Example 5. 159 grams of magnesium gold sulphhydryl keratinate are obtained as a light yellowish-grey powder easily soluble in water with a gold content of 15.7%.

*Example 7*

600 grams of wool are hydrolyzed as in Example 5, the acid hydrolysate is neutralized with ammonia. To the hydrolysate filtered from insoluble portions are then added 62 grams of sodium sulphite and after reaction for 2 days the reduced hydrolysate then caused to react as in Example 1 with an aqueous solution of gold chloride (hydrochloride). The acid hydrolysate thus reacted with the gold compound is thereupon rendered weakly alkaline with calcium hydroxide and the liquid filtered. The filtrate is stirred into 8 times the volume of methyl alcohol whereby the calcium salt of the gold sulphhydryl keratinic acid is precipitated in flocculent solid form. After separation from the methyl alcohol the calcium salt is washed with alcohol and ether and thereupon dried in vacuum at 65° C. 156 grams of calcium gold sulphhydryl keratinate are obtained as a white easily water-soluble powder with a gold content of 13.9%.

Of course, many changes and variations in the reaction conditions and the like may be employed by those skilled in the art in accordance with the principles set forth herein and in the claims annexed hereto.

What we claim is:

1. Process for the manufacture of complex water-soluble gold compounds of albumose-like keratin degradation products, containing sulphhydryl groups, wherein keratin substances are subjected to acid hydrolysis until the keratin substance has just passed into solution, with use of reducing agents and subsequent neutralization of the excess acid employed for the hydrolysis, and thereafter the hydrolysate thus obtained is caused to react with a gold compound without previous evaporation.

2. Process as claimed in claim 1, in which the reduction of the keratin degradation products takes place simultaneously with the acid hydrolysis of the keratin substances.

3. Process as claimed in claim 1, in which the keratin degradation product obtained by the acid hydrolysis of keratin substances are submitted to a subsequent reduction.

4. Process as claimed in claim 1, in which the reduction of the keratin degradation products obtained by the acid hydrolysis takes place with compounds belonging to the group of sulphurous acid and its neutral and acid alkali and alkaline earth metal salts.

5. Process as claimed in claim 1, in which the reaction with gold compounds is carried out by introducing such a quantity of gold that a complete saturation of the sulphhydryl group with gold is effected.

6. Process as claimed in claim 1 in which the hydrolysate is caused to react with a larger quantity of the gold compound than is just necessary for combination with sulphhydryl groups present.

7. Process as claimed in claim 1, in which after the reaction with gold compounds the solution is rendered weakly alkaline with an alkaline-reacting compound of a member of the group consisting of alkali and alkaline earth metals, and the complex gold compounds of the keratin degradation products thus obtained isolated.

8. Process as claimed in claim 1, in which the separation of the complex gold sulphhydryl keratinate compound takes place by mixing the liquid with several times the volume of an organic solvent miscible with water and the complex gold compound purified by dissolving once or several times in water and reprecipitating with the organic solvent.

9. Process as set forth in claim 1, in which the reduction of the keratin degradation products takes place in the presence of a heavy metal of the group consisting of iron, tin, and zinc.

ADOLF FELDT.
KARL SCHÖLLKOPF.